March 22, 1949.  J. H. HERRERA  2,464,862
WATER HEATER FOR INFUSIONS

Filed Aug. 26, 1946  2 Sheets-Sheet 1

INVENTOR.
Juan Hernandez Herrera
BY Singer, Ehlert, Stern & Carlberg,
ATTORNEYS.

March 22, 1949.   J. H. HERRERA   2,464,862
WATER HEATER FOR INFUSIONS

Filed Aug. 26, 1946   2 Sheets-Sheet 2

INVENTOR.
Juan Hernandez Herrera.
BY Singer, Ehlert, Stern & Carlberg,
ATTORNEYS.

Patented Mar. 22, 1949

2,464,862

UNITED STATES PATENT OFFICE 2,464,862

WATER HEATER FOR INFUSIONS

Juan Hernandez Herrera, Habana, Cuba

Application August 26, 1946, Serial No. 693,093

1 Claim. (Cl. 99—307)

This invention relates to devices for heating water for infusions, such as coffee infusions, and it has for its object to provide a heater device for instantaneously serving strained coffee infusions at cafes, hotels, restaurants, etc.

The present device comprises a water boiler at the atmosphere pressure, which has attached thereto a hot water container in communication with the boiler and enclosing a vessel adapted to receive a strained coffee infusion, and a strainer disposed above the hot water container, the latter being in communication with an air compressor through a tube provided with a valve, so that when it is desired to strain coffee, compressed air can be injected in the hot water container to permit the automatic supplying of hot water to the strainer, and the discharge of the infusion into the vessel enclosed in the hot water container, whereby the infusion is maintained in hot condition, the device thus being very simple in construction and easy to operate to supply at all times an infusion of coffee at a suitable temperature for immediate consumption.

The invention is described with reference to the figures of the accompanying drawing, of which:

Figure 1:
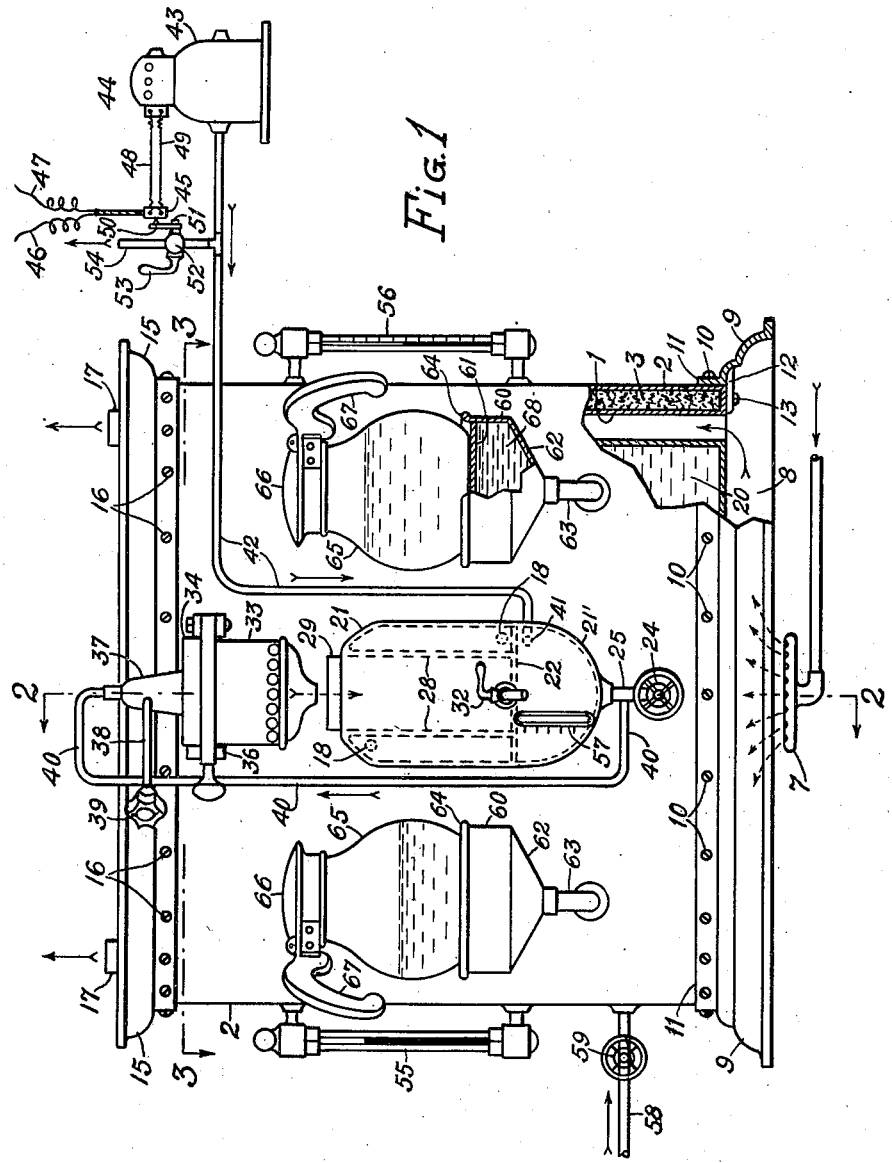
Fig. 1 is a front elevation view of the water heater of this invention.
Figure 2:
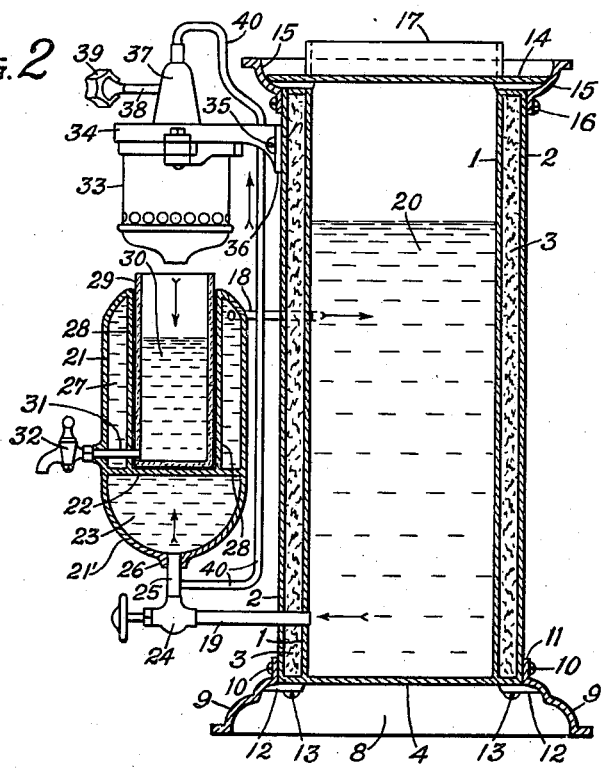
Fig. 2 is a vertical cross-section view of the heater on line 2—2 of Fig. 1.

The heater of this invention is composed of a vertical boiler of flattened elliptical shape in cross-section, which is made of a double wall of metal sheet 1—2 provided with an inner asbestos lining 3 to avoid the radiation of heat to the outside, and a metallic bottom 4. Said boiler has at each end an inner vertical curved wall 5 of a greater curvature than the end double wall 1—2 and spaced apart from it by a hollow space 6 of crescent cross-section adapted to serve as an exhaust tube for the combustion gases issuing from a liquid fuel burning at a burner 7 placed beneath the bottom 4. Said combustion gases are received within a combustion chamber 8 formed beneath the boiler bottom 4 by a bracket 9 which is secured to the outer wall of the boiler by a series of rivets 10 about a vertical flange 11 of said bracket 9 that surrounds the boiler and by means of spaced apart horizontal lugs 12 secured to by screws 13 to the bottom 4, the lugs being directed outwardly until interiorly engaging the peripherial wall of the bracket 9. The boiler is open at its top portion where it is covered by a removable cap 14 that freely seats by its edge on a flange of curved section 15 secured by rivets 16 about the outer wall of the boiler, said cap 14 having two openings in vertical alignment with the exhaust spaces 6 and surrounded by raised flanges 17 to allow the escape of combustion gases through said openings into the atmosphere.

Figure 3:
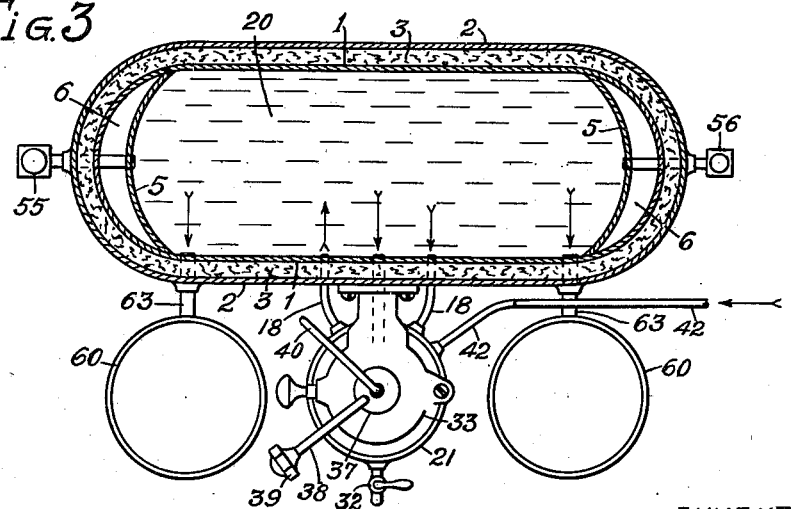
Fig. 3 is a horizontal sectional view of the heater on line 3—3 of Fig. 1.

At the front of the boiler and opposite the central portion thereof there is supported by horizontal tubes 18 and 19 at different heights and crossing the boiler double wall 1—2 to communicate with the water mass 20 contained therein, a metallic container 21 which is divided by a horizontal partition 22 into two chambers for hot water, viz. a lower chamber 23 to receive hot water from the boiler through the lower tube 19 which is provided with a T-union valve 24 connecting the tube 19 with a vertical branch tube 25 inserted in an opening 26 formed at the middle of a semi-spherical bottom-wall 21' forming the lower chamber 23 of the container 21; and an upper annular chamber 27 which is formed by the peripherial wall 21 of the container and an inner concentric cylindrical wall 28 upstanding on the partition 22 to provide a central cylindrical space whose upper end is open to the atmosphere and is adapted to fittingly receive a cylindrical glass vessel 29 adapted to receive a coffee infusion 30 which is to be discharged outside by a horizontal tube 31 passing through holes formed in the inner cylindrical wall 28, in the peripherial wall of vessel 29 and in the peripherial wall of container 21, said tube being provided with an outer valve 32. The upper chamber 27 is connected with the interior of the boiler 1—2 by two tubes 18 arranged at different heights as shown in Figs. 1 and 3.

Above the container 21 and in vertical alignment therewith there is disposed a strainer for a vegetable infusion, such as coffee infusion, which is supported at the top of the boiler 1—2 by a supporting plate 34 secured to the outer wall of the boiler by screws 35 passing across holes in vertical lugs 36 of said plate 34. The construction of said strainer is not described herein in detail as the same does not form a part of this invention, and it will only be said that the supporting plate 34 carries an admission cover for hot water 37 provided with an inner valve operable by a horizontal stem 38 provided with a handle 39, the upper open end of the cover 37 being connected by a descending tube 40 with a side hole formed in the branch tube 25 communicating the lower chamber 23 of the container 21 with the lower tube 19 communicating with the interior of the boiler.

From a hole 41 formed in the upper portion of the peripherial wall 21' enclosing the chamber 23 leads a tube 42 communicating said chamber with an air compressor 43 positioned outside the heater and coupled to an electric motor 44, the latter being automatically operable by a contacts-disc switching connection 45 placed between the electrical leads 46 and 47 from an electric source and the conductors 48 and 49 connecting the contacts-disc 45 to the motor 44. Upon said disc 45 actuates a contacts-carrier arm 50 secured to the rotatable stem 51 of a pass-valve 52 operable by a handle 53 and inserted through a tube branch 55 joined to the tube 42 for supplying compressed air to the lower chamber 23 of the container 21 and extending beyond the pass-valve 52. In this manner, as the valve 52 is closed, the switch will be automatically operated and it will close the connection between electric conductors 46, 47, 48 and 49, thus starting the operation of the electric motor 44 and the compressor 43 to inject compressed air into the chamber 23 to impel the hot water contained therein into the strainer 33, once the valve 24 closed.

The boiler 1—2 is provided with a level tube 55 and a thermometer 46, the hot water chamber 23 being likewise provided with a glass window 57 to allow verification of water level therein. The boiler 1—2 is supplied with water through a tube 58 with a valve 59, which tube comes from any suitable supply tank or cool water source.

In the use of this coffee heater at public establishments, the same is associated with two milk heaters consisting in two cylindrical containers 60 closed on top by a metal sheet 61 and having a conical bottom 62, said containers being positioned at each side of the container 21 and being supported on the boiler 1—2 by means of elbowed tubes 63 connecting an opening in the vertex of the conical bottom 62 with the interior of the boiler 1—2 passing across the double wall 1—2 and intermediate lining 3 thereof. The containers 69 have an upper circular edge 64, and the upper plate 61 thereof is adapted to receive a jar-shaped glass container 65 provided with a hinged metallic cover 66 having a handle 67, which is adapted to contain a consumption liquid such as milk, and which will be heated by convection heat from hot water 68 filling the container 60 and passing there through communication tube 63.

The operation of this heater and the associated strainer is as follows: Assuming the chambers 21 and 23 filled with hot water through their respective tubes 18 and 19 communicating with the interior of the boiler 1—2 by having previously opened the valve 24, and the valve 52 being opened allowing the exhaust of inner air from the chamber 23 and tube 42 into the atmosphere, when it is desired to produce an infusion of coffee, the strainer 33 is filled with ground coffee, whereafter the handle 39 is operated to open the valve interiorly of the cover 37 and the valve 52 is closed by operating the handle 53, whereupon the switch 50—45 will be operated, thereby starting the electric motor 44 and operating the air compressor 43 which will inject compressed air into the chamber 23 causing hot water from chamber 23 to come up through tube 40 into the cover 37, hot water being injected into the strainer 33 to form a coffee infusion which will fall through the strainer discharge opening into the vessel 29, and the infusion may be discharged from vessel 29 by means of the valve 32, in the desired amount. Once the straining operation terminated, the valve 52 will be opened, whereupon the switch 50—45 will be operated, causing the motor 44 and the compressor 43 to stop, and the valve 24 will be reopened so that the chamber 23 may again be filled with hot water from the boiler 1—2.

What I claim is:

A heater for infusions water, comprising a boiler for heating water at atmosphere pressure, a fuel burner placed beneath the boiler to heat the latter, a cylindrical metallic container supported exteriorly to the boiler and divided by a horizontal partition into two chambers; a closed lower chamber in communication by an opening at its bottom with the interior of the boiler through a tube provided with a valve, and a closed upper annular chamber formed of two concentric walls the inner one of which provides a central space the upper end of which is open to the atmosphere tube means connecting the interior of said upper annular chamber with the interior of the boiler, an infusion vessel within the central space of the upper chamber, a tube communicating the lower chamber through an opening at its bottom with the interior of the strainer, an air compressor, an electric motor coupled to the latter, a tube communicating the compressor with the top portion of the lower chamber of said container, a branch tube opening to the atmosphere and connected with the latter tube at a point thereof, a valve operable by hand in said branch tube, an electric switch inserted in the line for supplying electric energy to the motor and operable by a contacts carrier arm fixed on the rotatable stem of the latter valve, so that as the latter valve is closed the switch will be actuated to start the operation of the electric motor and the air compressor, and the compressed air injected by the latter into the top portion of the lower chamber of said container will raise to the said strainer the hot water contained in said lower chamber.

JUAN HERNANDEZ HERRERA.

REFERENCES CITED

The following references are of record in the file of this patent:

UNITED STATES PATENTS

| Number | Name | Date |
|---|---|---|
| 894,746 | Reynolds | July 28, 1908 |
| 964,029 | Langworthy | July 12, 1910 |
| 2,086,127 | Gordon et al. | July 6, 1937 |
| 2,371,328 | Herrera | Mar. 13, 1945 |

FOREIGN PATENTS

| Number | Country | Date |
|---|---|---|
| 206,600 | Great Britain | Nov. 12, 1923 |
| 295,524 | Italy | Apr. 23, 1932 |